United States Patent
Lim et al.

(10) Patent No.: US 11,018,501 B2
(45) Date of Patent: May 25, 2021

(54) DIRECTIONAL OVERCURRENT RELAY USING SUPERCONDUCTING FAULT CURRENT LIMITER VOLTAGE AND METHOD FOR CORRECTING THE SAME

(71) Applicant: Foundation of Soongsil University-Industry Cooperation, Seoul (KR)

(72) Inventors: Sung Hun Lim, Seoul (KR); Seung Taek Lim, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 257 days.

(21) Appl. No.: 16/199,130

(22) Filed: Nov. 23, 2018

(65) Prior Publication Data
US 2020/0014198 A1 Jan. 9, 2020

(30) Foreign Application Priority Data
Jul. 4, 2018 (KR) .................. 10-2018-0077757

(51) Int. Cl.
*H02H 9/02* (2006.01)
*H02H 7/00* (2006.01)
*H02H 3/093* (2006.01)

(52) U.S. Cl.
CPC ............ *H02H 9/023* (2013.01); *H02H 3/093* (2013.01); *H02H 7/001* (2013.01)

(58) Field of Classification Search
CPC ......... H02H 3/093; H02H 7/001; H02H 9/023
(Continued)

(56) References Cited

FOREIGN PATENT DOCUMENTS

| JP | 6109453 B1 | 4/2017 | |
|---|---|---|---|
| KR | 10-1372823 B1 | 3/2014 | |
| KR | 101372823 | * 3/2014 | ............... H02H 3/08 |

OTHER PUBLICATIONS

Seung-Taek Lim, Sung-Hun Lim, "Study on Operation of DOCR using Voltage Component", 2018 Proceedings of the Korean Institute of Electrical Engineers Spring Conference (Apr. 26-27, 2018). This article is a prior disclosure made by the inventor(s) which is not prior art under 35 USC 102(b)(1).

(Continued)

*Primary Examiner* — Alex Torres-Rivera
*Assistant Examiner* — David A. Singh
(74) *Attorney, Agent, or Firm* — Novick, Kim & Lee, PLLC; Sang Ho Lee

(57) ABSTRACT

A directional overcurrent relay using a superconducting fault current limiter voltage as a relay element includes: a current measuring circuit measuring a current of a line connected from a system power source to a load, a voltage measuring circuit measuring a voltage at both ends of a superconducting fault current limiter connected to the line, and a correcting circuit correcting a tripping time $T_{trip}$ by using a fault current $I_f$ that is the current of the line and a superconducting fault current limiter voltage $V_{SFCL}$ that is the voltage at both ends of the superconducting fault current limiter and the tripping time $T_{trip}$ is maintained consistently regardless of whether the superconducting fault current limiter operates or not.

8 Claims, 6 Drawing Sheets

(58) Field of Classification Search
USPC .......................................................... 361/19
See application file for complete search history.

(56) References Cited

OTHER PUBLICATIONS

Seung-Taek Lim, "Study on Application of Overcurrent Relay with Voltage Component Considering the SFCL in a Power Distribution System" Thesis Paper, Soongsil University (Dec. 2017). English abstract at pp. ix-x. This thesis paper is a prior disclosure made by the inventor(s) which is not prior art under 35 USC 102(b)(1).

* cited by examiner

DIRECTIONAL OVERCURRENT RELAY USING SUPERCONDUCTING FAULT CURRENT LIMITER VOLTAGE AND METHOD FOR CORRECTING THE SAME

CROSS-REFERENCE TO RELATED APPLICATIONS

This application claims priority to Korean Patent Application No. 10-2018-0077757, filed on Jul. 4, 2018, and all the benefits accruing therefrom under 35 U.S.C. § 119, the contents of which in its entirety are herein incorporated by reference.

TECHNICAL FIELD

The present disclosure relates to a directional overcurrent relay using a superconducting fault current limiter voltage as a relay element and a method for correcting the same, and more particularly, to a directional overcurrent relay using a superconducting fault current limiter voltage for maintaining an existing relay protection system as a relay element and a method for correcting the same.

BACKGROUND

As a dispersed generation DG using various renewable energy sources such as solar power, wind power and the like increases, the power system is becoming complicated and changed, and also a fault current is increased.

A superconducting fault current limiter SFCL has been proposed to resolve this problem. However, if the superconducting fault current limiter is applied to a power system, the magnitude of the fault current would be reduced due to an impedance of the superconducting fault current limiter. Here, system-protecting devices which are previously installed and operating according to a fault current may malfunction or erroneously operate by exceeding a preset operation time, which may cause a problem in the system protection equipment.

Representatively, if the superconducting fault current limiter is applied to a power system, a delay may occur in trip operation of the overcurrent relay due to the decrease of the fault current. In order to solve this problem, it is necessary to change the setting value of the overcurrent relay. However, there are problems that the protection regulations guided by Korea Electric Power Corporation (KEPCO), Institute of Electrical and Electronics Engineers (IEEE) and International Electrotechnical Commission (IEC) must be satisfied and the calculation becomes complicated by considering the setting values of other protection devices.

SUMMARY

The present disclosure is directed to providing a directional overcurrent relay, which uses a superconducting fault current limiter voltage that maintains a preset correction value and maintains a tripping time consistently regardless of whether or not a power system performs a fault current-limiting operation by using the voltage at both ends of the superconducting fault current limiter, as a relay element, and a method for correcting the same.

According to one embodiment of the present disclosure, a directional overcurrent relay using a superconducting fault current limiter voltage as a relay element is provided. The directional overcurrent relay may include a current measuring circuit measuring a current of a line connected from a system power source to a load, a voltage measuring circuit measuring a voltage at both ends of a superconducting fault current limiter connected to the line, and a correcting circuit correcting a tripping time $T_{trip}$ by using a fault current $I_f$ that is the current of the line and a superconducting fault current limiter voltage $V_{SFCL}$ that is the voltage at both ends of the superconducting fault current limiter and the tripping time $T_{trip}$ is maintained consistently regardless of whether the superconducting fault current limiter operates or not.

The correcting circuit calculates a characteristic variable M allowing a decreased amount of the fault current $I_f$ due to the operation of the superconducting fault current limiter to be compensated by the superconducting fault current limiter voltage $V_{SFCL}$, and corrects the tripping time $T_{trip}$ by using the characteristic variable M.

When a fault occurs, the correcting circuit may modify the superconducting fault current limiter voltage $V_{SFCL}$ by using a modification factor α that is preset by a ratio $I_f/I_f^{SFCL}$ of the current measured at the line according to whether the superconducting fault current limiter operates and an impedance $Z_{SFCL}$ of the superconducting fault current limiter, and calculates the characteristic variable M.

The correcting circuit maintains a time lever value TD and a current tap value $I_{pickup}$ that are preset, and corrects the tripping time $T_{trip}$ by controlling the characteristic variable M according to the superconducting fault current limiter voltage $V_{SFCL}$.

The directional overcurrent relay may further include a trip signal transmitting circuit transmitting a trip signal to the breaker and operating a breaker that blocks the fault current $I_f$ flowing to the load when the tripping time $T_{trip}$ is reached.

According to another embodiment of the present disclosure, a method for correcting a directional overcurrent relay that uses a superconducting fault current limiter voltage. The method includes measuring a fault current $I_f$ that is a current of a line connected from a system power source to a load, measuring a superconducting fault current limiter voltage $V_{SFCL}$ that is a voltage at both ends of a superconducting fault current limiter connected to the line, and correcting a tripping time $T_{trip}$ by using the fault current $I_f$ and the superconducting fault current limiter voltage $V_{SFCL}$ and the tripping time $T_{trip}$ is maintained consistently regardless of whether the superconducting fault current limiter operates or not.

The correcting the tripping time $T_{trip}$ may include calculating a characteristic variable M for allowing a decreased amount of the fault current $I_f$ due to the operation of the superconducting fault current limiter to be compensated by the superconducting fault current limiter voltage $V_{SFCL}$.

The correcting the tripping time $T_{trip}$ may include when a fault occurs, modifying the superconducting fault current limiter voltage $V_{SFCL}$ by using a modification factor α that is preset by a ratio $I_f/I_f^{SFCL}$ of the current measured at the line according to whether the superconducting fault current limiter operates and an impedance $Z_{SFCL}$ of the superconducting fault current limiter, calculating a characteristic variable M for allowing a decreased amount of the fault current $I_f$ due to the operation of the superconducting fault current limiter to be compensated by the superconducting fault current limiter voltage $V_{SFCL}$ modified by using the modification factor α, and correcting the tripping time $T_{trip}$ by using the characteristic variable M.

In the correcting the tripping time $T_{trip}$, a time lever value TD and a current tap value $I_{pickup}$ that are preset are maintained, and the tripping time $T_{trip}$ is corrected by controlling the characteristic variable M according to the superconducting fault current limiter voltage $V_{SFCL}$.

The method further includes transmitting a trip signal for operating a breaker that blocks the fault current $I_f$ flowing to the load when the tripping time $T_{trip}$ is reached, to the breaker. According to the present disclosure, it is possible to reduce a trip delay caused by applying a superconducting fault current limiter while maintaining a preset correction value regardless of whether a power system performs a fault current-limiting operation. Thus, an existing relay protection system may be maintained and applied to various power systems, and it is possible to prevent shortening of life and burning of the power system and electronic devices.

DETAILED DESCRIPTION OF EMBODIMENTS

Figure 1:
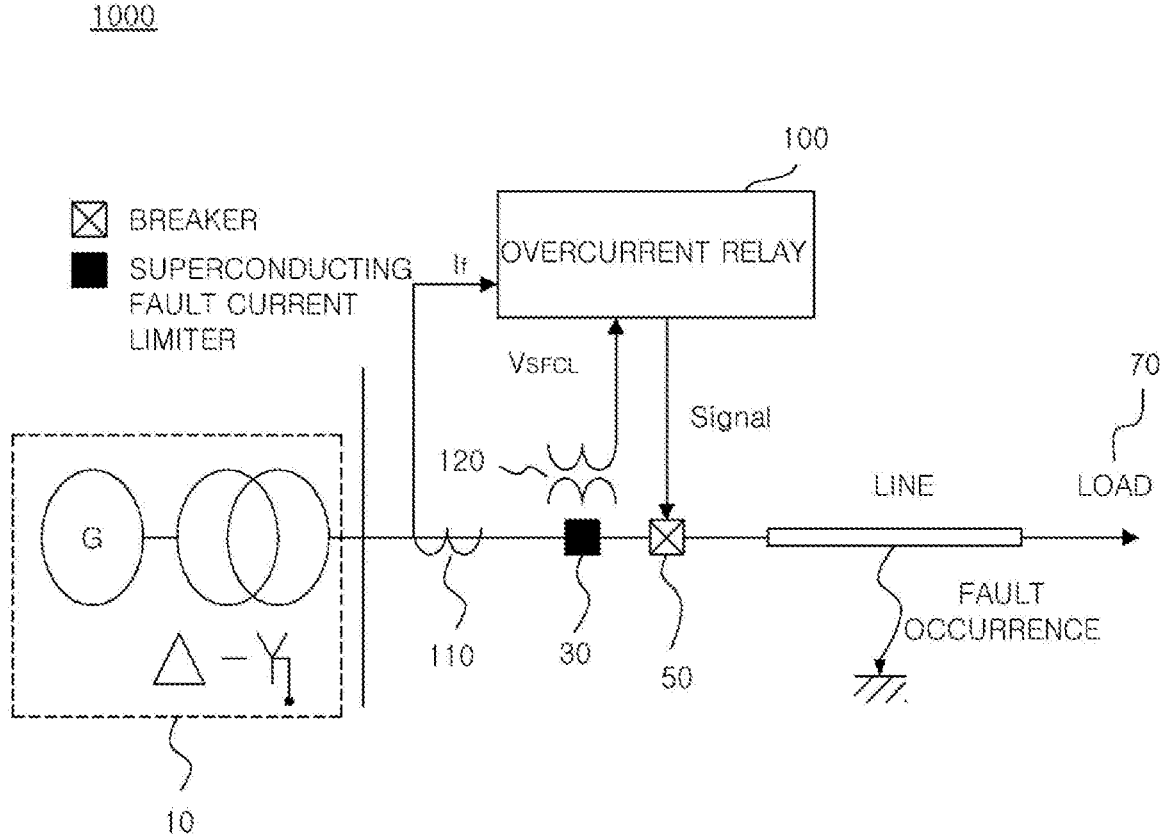
FIG. 1 is a diagram showing a power system including a directional overcurrent relay that uses a superconducting fault current limiter voltage as a relay element according to an embodiment of the present disclosure.

The present disclosure will be described in detail with reference to the accompanying drawings which illustrate, by way of example, specific embodiments in which the present disclosure may be implemented. These embodiments are described in sufficient detail to enable those skilled in the art to implement the present disclosure. It should be understood that various embodiments of the present disclosure are different from each other but need not be mutually exclusive. For example, specific features, structures and characteristics described herein may be implemented in other embodiments without departing from the scope of the present disclosure in connection with one embodiment. It should also be understood that the position or arrangement of individual components in each embodiment may be varied without departing from the scope of the present disclosure. Therefore, the following detailed description is not taken to limit the present disclosure, and the scope of the present disclosure is limited only by the appended claims, along with the full scope of equivalents to which such claims are entitled. In the drawings, like reference signs refer to the same or similar functions throughout several aspects.

A/an: The indefinite articles "a" and "an" as used herein mean one or more when applied to any feature in embodiments and implementations of the present invention described in the specification and claims. The use of "a" and "an" does not limit the meaning to a single feature unless such a limit is specifically stated. The term "a" or "an" entity refers to one or more of that entity. As such, the terms "a" (or "an"), "one or more" and "at least one" can be used interchangeably herein.

At least: As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements). The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Based on: "Based on" does not mean "based only on", unless expressly specified otherwise. In other words, the phrase "based on" describes both "based only on," "based at least on," and "based at least in part on."

Comprising: In the claims, as well as in the specification, all transitional phrases such as "comprising," "including," "carrying," "having," "containing," "involving," "holding," "composed of," and the like are to be understood to be open-ended, i.e., to mean including but not limited to.

Determining: "Determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

Embodiments: Reference throughout the specification to "one embodiment," "an embodiment," "some embodiments," "one aspect," "an aspect," "some aspects," "some implementations," "one implementation," "an implementation," or similar construction means that a particular component, feature, structure, method, or characteristic described in connection with the embodiment, aspect, or implementation is included in at least one embodiment and/or implementation of the claimed subject matter. Thus, the appearance of the phrases "in one embodiment" or "in an embodiment" or "in some embodiments" (or "aspects" or "implementations") in various places throughout the specification are not necessarily all referring to the same embodiment and/or implementation. Furthermore, the particular features, structures, methods, or characteristics may be combined in any suitable manner in one or more embodiments or implementations.

The term "unit" is defined herein as having its broadest definition to an ordinary skill in the art to refer to a software including instructions executable in a non-transitory computer readable medium that would perform the associated function when executed, a circuit designed to perform the associated function, a hardware designed to perform the associated function, or a combination of software, a circuit, or a hardware designed to perform the associated function.

Hereinafter, preferred embodiments of the present disclosure will be described in more detail with reference to the drawings.

Figure 2:
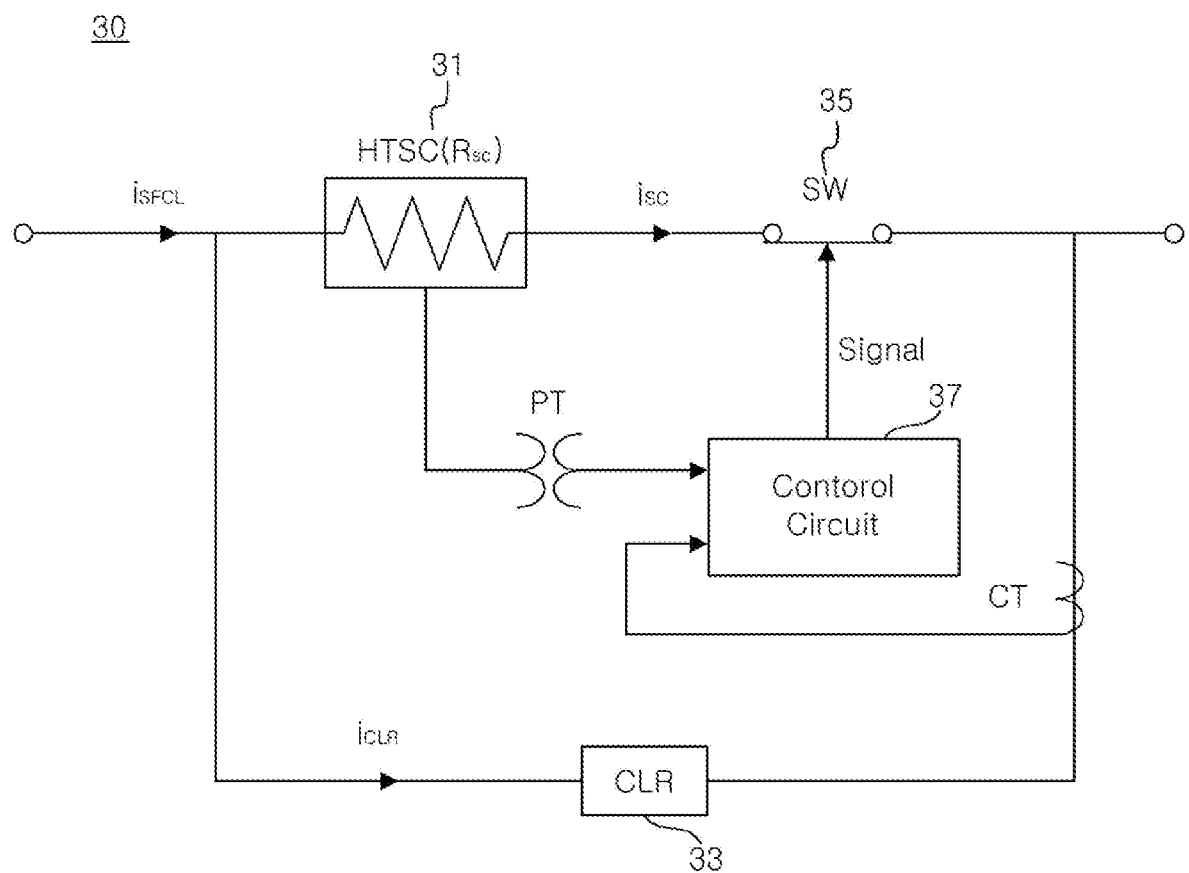
FIG. 2 shows one example of the superconducting fault current limiter depicted in FIG. 1.

FIG. 1 is a diagram showing a power system including a directional overcurrent relay that uses a superconducting fault current limiter voltage as a relay element according to an embodiment of the present disclosure, and FIG. 2 shows an example of the superconducting fault current limiter depicted in FIG. 1.

Referring to FIG. 1, a directional overcurrent relay (hereinafter, referred to as an overcurrent relay) 100 using a superconducting fault current limiter voltage as a relay element according to the embodiment of the present disclosure is included in a power system 1000 to construct a system protection equipment.

The power system 1000 may include a system power source 10, a superconducting fault current limiter 30, a breaker 50, an overcurrent relay 100, and a load 70.

The system power source 10 may include an AC power source and a transformer coupled to the AC power source. A protection device may be provided between the AC power source and the transformer.

The superconducting fault current limiter 30 may be connected to a line drawn from the system power source 10. One end of the superconducting fault current limiter 30 may be connected to the system power source 10 and the other end thereof may be connected to the breaker 50, which will be described later.

When a fault current exceeding a critical current occurs, the superconducting fault current limiter 30 may reduce the fault current by using a quench characteristic of the superconducting element. For example, the superconducting fault current limiter 30 may be implemented in a trigger type as shown in FIG. 2.

Referring to FIG. 2, the superconducting fault current limiter 30 may include a superconductor 31, a current-limiting reactor 33, a power switch 35, and a control circuit 37. In the superconducting fault current limiter 30, all current may flow only through the superconductor 31 at a normal state. When a fault current occurs, the superconducting fault current limiter 30 may limit the fault current by means of the current-limiting reactor 33 by quenching the superconductor 31 to open the power switch 35.

The breaker 50 may be connected to the line drawn from the system power source 10. One end of the breaker 50 may be connected to the superconducting fault current limiter 30 and the other end thereof may be connected to the load 70.

When a fault current exceeding a rated current occurs, the breaker 50 may block the fault current flowing to the load 70. For example, the breaker 50 may be implemented as an electromagnet breaker, a bimetallic breaker, an electromagnet bimetallic breaker, or the like. The breaker 50 may operate according to a trip signal of the overcurrent relay 100 which will be described later, to block the fault current flowing to the load 70.

The overcurrent relay 100 may set the breaker 50 to block a fault current flowing to the load 70 when the fault current exceeding a rated current occurs. In other words, when a fault current occurs, the overcurrent relay 100 may set a tripping time $T_{trip}$ that is an operation time of the breaker 50, and then may transmit the trip signal to the breaker 50 if the tripping time $T_{trip}$ is reached.

The tripping time $T_{trip}$ generally has an inverse time characteristic that is inversely proportional to the magnitude of the fault current. Thus, as to the superconducting fault current limiter 30 is applied to the power system 1000 as shown in FIG. 1, when a fault current occurs, the fault current is reduced by the superconducting fault current limiter 30. Consequently, the tripping time $T_{trip}$ is increased. Accordingly, the overcurrent relay 100 may cause a malfunction such as a trip delay depending on whether the superconducting fault current limiter 30 operates or not, which adversely affects electrical and electronic devices included in the power system 1000.

The overcurrent relay 100 may correct the tripping time $T_{trip}$ to reduce the trip delay in reply to whether the superconducting fault current limiter 30 operates or not. Regarding the method for correcting the overcurrent relay 100, a method of changing a preset correction value such as a time lever value TD and a current tap value $I_{pickup}$ is generally used. However, the correction method using the current tap value $I_{pickup}$ may not meet the guidelines of KEPCO, and the correction method using the lever value TD may cause malfunction or erroneous operation of the overcurrent relay 100 in reply to whether the superconducting fault current limiter 30 operates or not since it is based on the premise that the superconducting fault current limiter 30 is operating.

The overcurrent relay 100 according to the embodiment of the present disclosure may correct the tripping time $T_{trip}$ while maintaining the preset correction value, by using a voltage of the superconducting fault current limiter 30 as a relay element.

Hereinafter, the overcurrent relay 100 according to the embodiment of the present disclosure will be described in detail.

Figure 3:
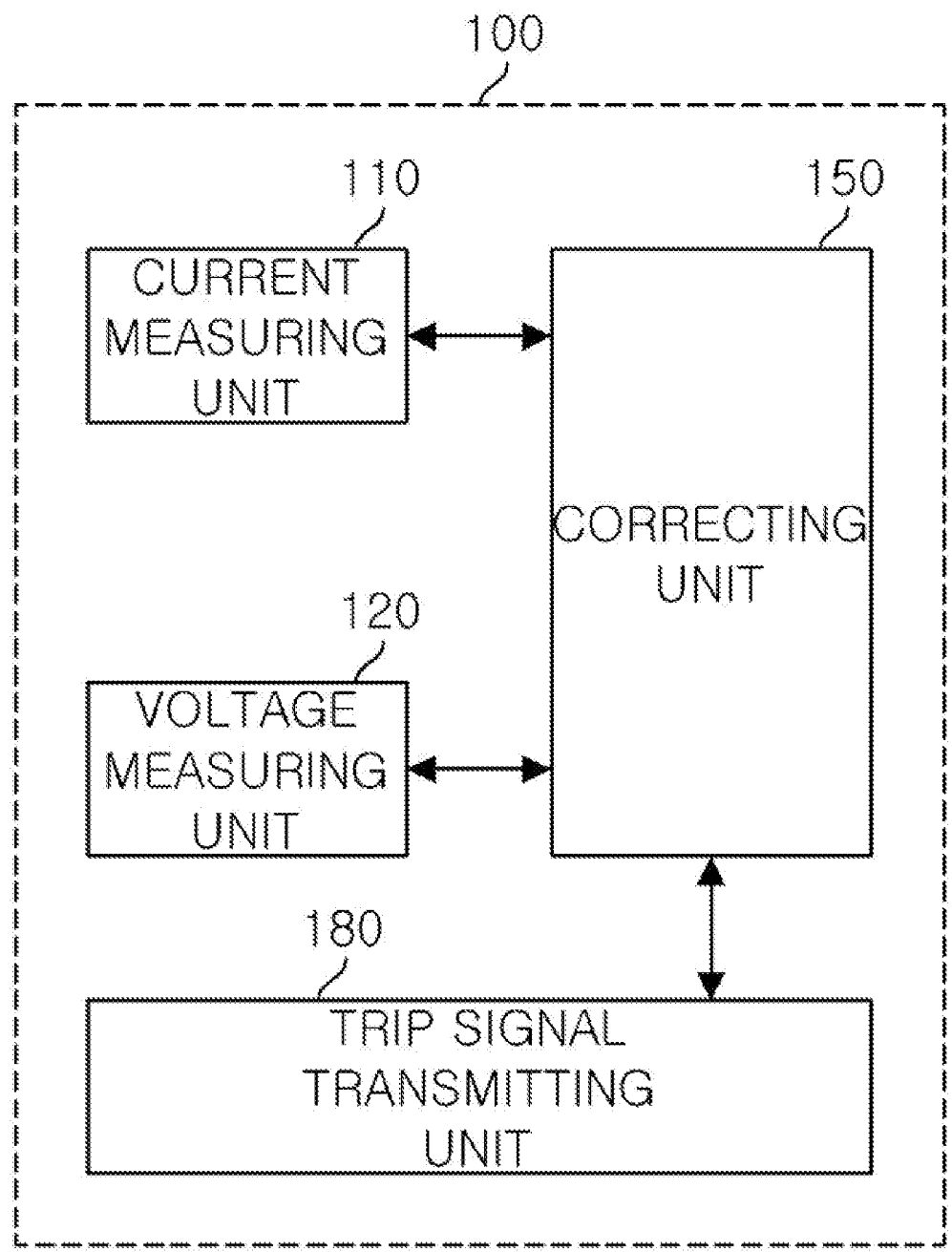
FIG. 3 is a schematic block diagram showing the overcurrent relay according to the embodiment of the present disclosure.

FIG. 3 is a schematic block diagram showing the overcurrent relay according to the embodiment of the present disclosure.

Referring to FIG. 3, the overcurrent relay 100 according to the embodiment of the present disclosure may include a current measuring unit 110, a voltage measuring unit 120, a correcting unit 150, and a trip signal transmitting unit 180.

The current measuring unit 110 may measure a current of the line connected from the system power source 10 to the load 70. As shown in FIG. 1, the current measuring unit 110 may be implemented as a gauge transformer. As shown in FIG. 1, if a fault occurs between the breaker 50 and the load 70, the current of the line measured by the current measuring unit 110 may be a fault current $I_f$.

The voltage measuring unit 120 may measure a voltage at both ends of the superconducting fault current limiter 30 connected to the line. As shown in FIG. 1, the voltage measuring unit 120 may be implemented as a gauge transformer. The voltage measured at the voltage measuring unit 120 may be a superconducting fault current limiter voltage $V_{SFCL}$.

The correcting unit 150 may set a tripping time $T_{trip}$ for interrupting the fault current within a predetermined time when a fault current occurs at the power system 1000. The correcting unit 150 may correct the tripping time $T_{trip}$ so that the trip delay caused by the operation of the superconducting fault current limiter 30 at the power system 1000 may be prevented. Accordingly, the correcting unit 150 may always set the same tripping time $T_{trip}$ regardless of whether the superconducting fault current limiter 30 operates or not.

Specifically, the correcting unit 150 may set the tripping time $T_{trip}$ according to Equation 1 below.

$$T_{trip} = TD \times \left( \frac{A}{M^P - 1} + B \right) \qquad \text{[Equation 1]}$$

In Equation 1, $T_{trip}$ denotes a tripping time, TD denotes a time lever set value, and A, B and p denote characteristic values of the overcurrent relay 100.

According to Equation 1, when the tripping time $T_{trip}$ is calculated, it can be found that TD, A, B and p are all preset values and M is a variable. In the following description, M will be referred to a characteristic variable.

The characteristic variable M may be generally calculated using Equation 2 below.

$$M = \frac{I_f}{I_{pickup}} \quad \text{[Equation 2]}$$

In Equation 2, $I_f$ denotes a fault current, and $I_{pickup}$ denotes a pickup current value as a current tap value.

According to Equation 2, since the current tap value $I_{pickup}$ is a preset correction value, it can be found that the tripping time $T_{trip}$ has an inverse time characteristic that is inversely proportional to the magnitude of the fault current $I_f$. Thus, in the power system 1000, if the fault current $I_f$ is reduced as the superconducting fault current limiter 30 operates, the characteristic variable M is also reduced, and thus the tripping time $T_{trip}$ increases, which may cause a trip delay. In other words, in the power system 1000, according to whether the superconducting fault current limiter 30 operates or not, the characteristic variable M may be changed to generate a trip delay.

In order to reduce the trip delay, in the conventional art, preset correction values such as the time lever value TD and the current tap value $I_{pickup}$ may be varied. The correction value may be set and stored in advance to cooperate with other protection devices of the power system 1000, on the assumption that the superconducting fault current limiter 30 is not applied to the power system 1000. However, since changing the correction value is limited depending on situations, there is a limit in reducing the trip delay.

Thus, the correcting unit 150 may correct the tripping time $T_{trip}$ by controlling the fault current $I_f$ according to the superconducting fault current limiter voltage $V_{SFCL}$ while maintaining the preset correction values such as the time lever value TD and the current tap value $I_{pickup}$. For this, the correcting unit 150 may deduct an equation for calculating the characteristic variable M to suppress the change of the characteristic variable M in reply to whether the superconducting fault current limiter 30 operates or not, as in Equation 3 below.

$$M = \frac{I_f + \alpha \times V_{SFCL}}{I_{pickup}} \quad \text{[Equation 3]}$$

In Equation 3, $I_f$ denotes a fault current, α denotes a modification factor, $V_{SFCL}$ denotes a superconducting fault current limiter voltage, and $I_{pickup}$ denotes a pickup current value as a current tap value.

According to Equation 3, if the superconducting fault current limiter 30 does not operate or is removed, the superconducting fault current limiter voltage $V_{SFCL}$ becomes 0, and thus Equation 3 is identical to Equation 2. Also, if the superconducting fault current limiter 30 operates, the superconducting fault current limiter voltage $V_{SFCL}$ has a positive value. Here, the superconducting fault current limiter voltage $V_{SFCL}$ compensates for a decreased amount of the fault current $I_f$ by the operation of the superconducting fault current limiter 30, and as a result, a characteristic variable M similar to the characteristic variable M calculated by Equation 2 may be calculated.

The correcting unit 150 may deduct an equation for calculating a modification factor α in Equation 3 by using Equation 4 below. The correcting unit 150 may modify the superconducting fault current limiter voltage $V_{SFCL}$ by using the modification factor α so that the characteristic variable M may be calculated regardless of whether the superconducting fault current limiter 30 operates or not. For this, the correcting unit 150 may deduct an equation for calculating the modification factor α as in Equation 4 below, from the fact that the characteristic variable M according to Equation 2 when the superconducting fault current limiter 30 does not operate and the characteristic variable M according to Equation 3 when the superconducting fault current limiter 30 operates must be identical to each other.

$$\alpha = \frac{(I_f / I_f^{SFCL}) - 1}{Z_{SFCL}} \quad \text{[Equation 4]}$$

In Equation 4, α denotes a modification factor, $I_f$ denotes a fault current when the superconducting fault current limiter 30 does not operate at the power system 1000, $I_f^{SFCL}$ denotes a fault current when the superconducting fault current limiter 30 operates at the power system 1000, and $Z_{SFCL}$ denotes an impedance of the superconducting fault current limiter 30.

In Equation 4, the correcting unit 150 may check the fault current $I_f$ when the superconducting fault current limiter 30 does not operate at the power system 1000 and the fault current $I_f^{SFCL}$ when the superconducting fault current limiter 30 operates at the power system 1000 by analyzing the power system 1000. In addition, in order to calculate the modification factor α more accurately, the correcting unit 150 preferably sets the impedance $Z_{SFCL}$ of the superconducting fault current limiter 30 as a convergence value of the impedance of the superconducting fault current limiter 30 where the fault current $I_f$ is flowing.

As described above, the correcting unit 150 may reduce the trip delay by maintaining the preset correction values such as the time lever value TD and the current tap value $I_{pickup}$ and consistently maintaining the tripping time $T_{trip}$ regardless of whether the superconducting fault current limiter 30 operates at the power system 1000 in a way of automatically controlling the fault current $I_f$ by the superconducting fault current limiter voltage $V_{SFCL}$ according to Equations 1, 3 and 4.

If the tripping time $T_{trip}$ is reached, the trip signal transmitting unit 180 may transmit a trip signal for operating the breaker 50 to the breaker 50. The breaker 50 may operate to block the fault current $I_f$ flowing to the load 70, when the trip signal occurs.

As described above, since the overcurrent relay 100 according to the embodiment of the present disclosure is capable of reducing the trip delay generated by applying the superconducting fault current limiter 30 while maintaining the preset correction values regardless of the presence of a fault current-limiting operation at the power system 1000, it is possible to prevent life shortening or damage of the power system 1000 and other electronic devices while maintaining an existing relay protection system. Moreover, the overcurrent relay 100 according to the embodiment of the present disclosure may be implemented as a directional overcurrent relay and applied to various power systems.

Hereinafter, a method for correcting the overcurrent relay 100 according to the embodiment of the present disclosure will be described.

Figure 4:
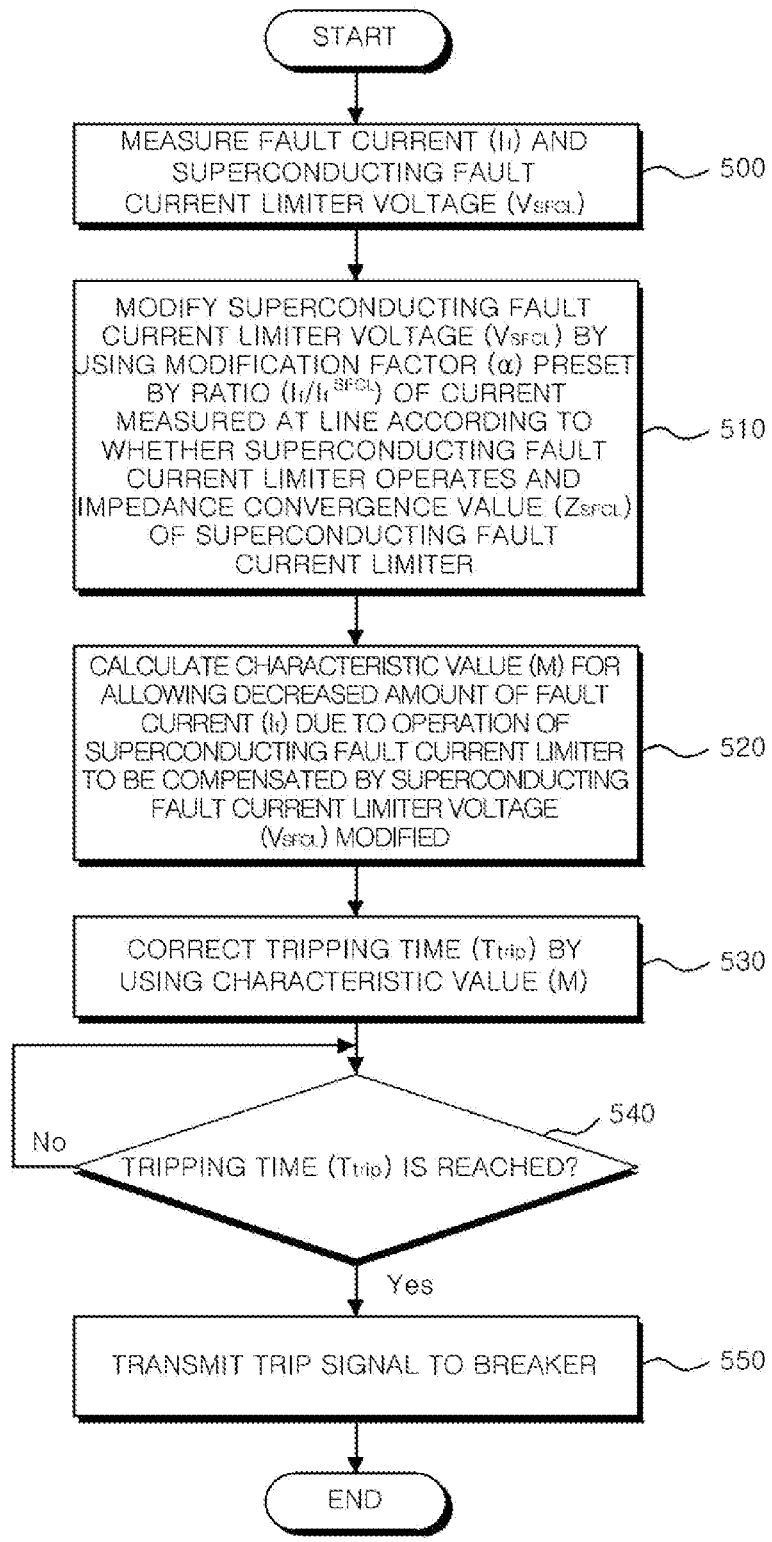
FIG. 4 is a flowchart for illustrating operations of the overcurrent relay according to the embodiment of the present disclosure.

FIG. 4 is a flowchart for illustrating operations of the overcurrent relay according to an embodiment of the present disclosure.

Referring to FIG. 4, the overcurrent relay 100 may measure a fault current $I_f$ and a superconducting fault current limiter voltage $V_{SFCL}$ (S500).

The overcurrent relay 100 may measure the fault current $I_f$ that is a current of a line connected from the system power source 10 to the load 70. In addition, the overcurrent relay 100 may measure the superconducting fault current limiter voltage $V_{SFCL}$ that is a voltage at both ends of the superconducting fault current limiter 30 connected to the line.

The overcurrent relay 100 may modify the superconducting fault current limiter voltage $V_{SFCL}$ by using a modification factor α preset by a ratio $I_f/I_f^{SFCL}$ of the current measured at the line according to whether the superconducting fault current limiter 30 operates and an impedance convergence value $Z_{SFCL}$ of the superconducting fault current limiter 30 (S510), calculate a characteristic variable M for allowing a decreased amount of the fault current $I_f$ due to the operation of the superconducting fault current limiter 30 to be compensated by the superconducting fault current limiter voltage $V_{SFCL}$ modified (S520), and correct the tripping time $T_{trip}$ by using the characteristic variable M) (S530).

According to the method for correcting an overcurrent relay according to the embodiment of the present disclosure, the tripping time $T_{trip}$ may be corrected by controlling the fault current $I_f$ according to the superconducting fault current limiter voltage $V_{SFCL}$. At this time, the overcurrent relay 100 may modify the superconducting fault current limiter voltage $V_{SFCL}$ by using the modification factor α so that the characteristic variable M that is a variable for calculating the tripping time $T_{trip}$ may be calculated consistently regardless of whether the superconducting fault current limiter 30 operates or not. For this, an equation for calculating the modification factor α in Equation 4 may be deducted from the fact that the characteristic variable M according to Equation 2 when the superconducting fault current limiter 30 does not operate and the characteristic variable M according to Equation 3 when the superconducting fault current limiter 30 operates must be identical to each other, and the modification factor α may be set in advance according to Equation 4.

The overcurrent relay 100 may calculate the characteristic variable M for allowing a decreased amount of the fault current $I_f$ due to the operation of the superconducting fault current limiter 30 to be compensated by the superconducting fault current limiter voltage $V_{SFCL}$ modified by using Equation 3. In addition, the overcurrent relay 100 may correct the tripping time $T_{trip}$ in a way of controlling the fault current $I_f$ according to the superconducting fault current limiter voltage $V_{SFCL}$ while maintaining the preset correction values such as the time lever value TD and the current tap value $I_{pickup}$ by applying the characteristic variable M to Equation 1.

If the tripping time $T_{trip}$ is reached (S540), the overcurrent relay 100 may transmit a trip signal to the breaker 50 (S550).

The breaker 50 may operate according to the trip signal of the overcurrent relay 100 to block the fault current flowing to the load 70.

Hereinafter, the advantageous effects of the method for correcting an overcurrent relay according to the embodiment of the present disclosure will be described.

Figure 5A:
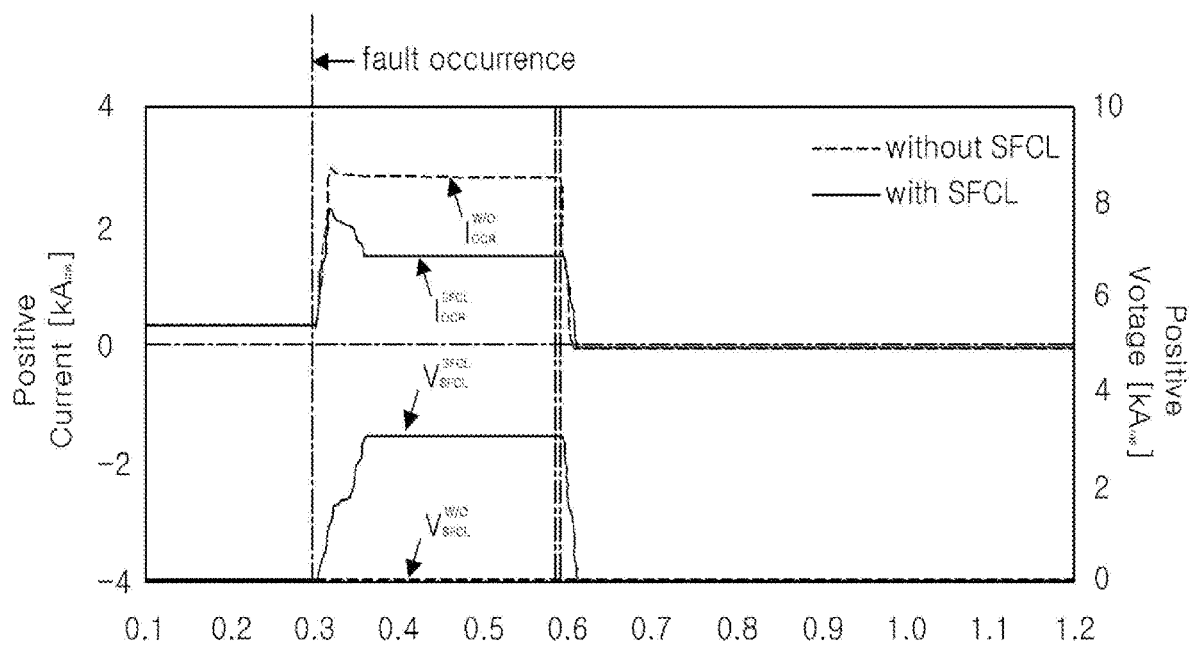
FIGS. 5A and 5B are diagrams for illustrating advantageous effects of a method for correcting an overcurrent relay according to the embodiment of the present disclosure.
Figure 5B:
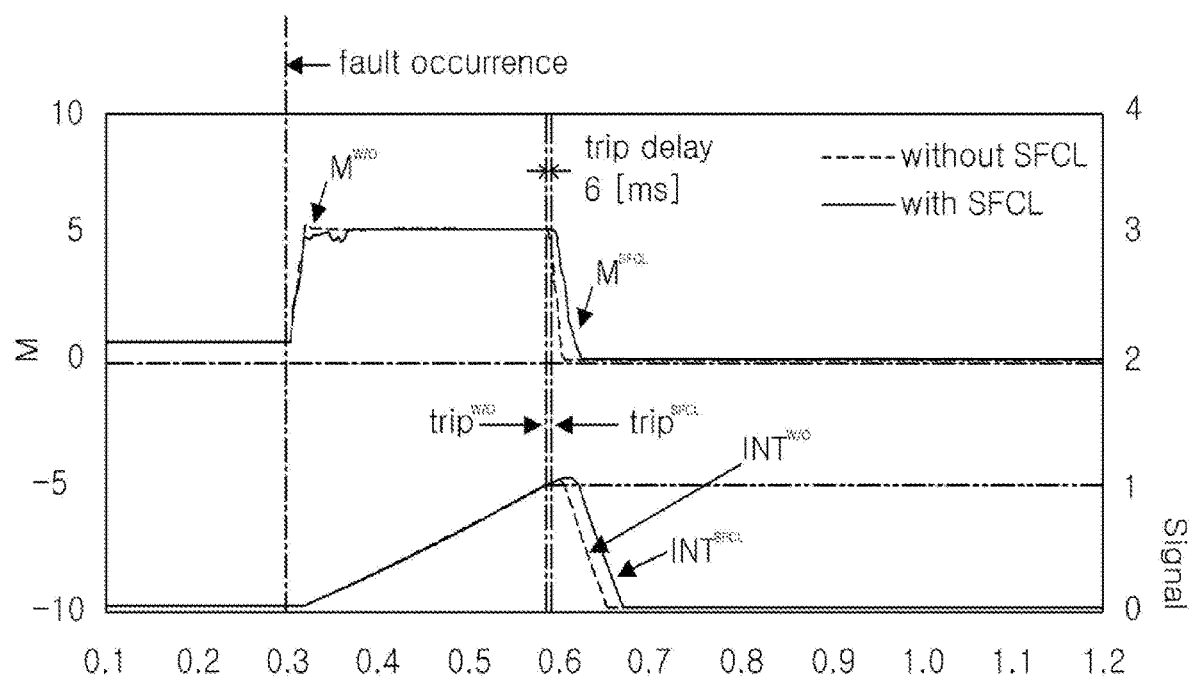

FIGS. 5A and 5B are diagrams for illustrating advantageous effects of a method for correcting an overcurrent relay according to the embodiment of the present disclosure.

Referring to FIG. 5A, a line current $I_{OCR}^{W/O}$ when the superconducting fault current limiter 30 does not operate and a line current $I_{OCR}^{SFCL}$ when the superconducting fault current limiter 30 operates may be checked. If the line current $I_{OCR}^{W/O}$ when the superconducting fault current limiter 30 does not operate and the line current $I_{OCR}^{SFCL}$ when the superconducting fault current limiter 30 operates are compared, when a fault occurs, it can be found that the fault current is reduced to about a 60% level due to the operation of the superconducting fault current limiter 30. Moreover, when a fault occurs, if the superconducting fault current limiter 30 operates, it can be found that the superconducting fault current limiter voltage $V_{SFCL}^{SFCL}$ is measured as a positive value.

In addition, referring to FIG. 5B, according to the method for correcting an overcurrent relay according to an embodiment of the present disclosure, a characteristic variable $M^{W/O}$ for checking the tripping time $T_{trip}$ when the superconducting fault current limiter 30 does not operate and a characteristic variable $M^{SFCL}$ when the superconducting fault current limiter 30 operates may be checked. According to the method for correcting an overcurrent relay according to an embodiment of the present disclosure, the characteristic variable $M^{W/O}$ calculated when the superconducting fault current limiter 30 does not operate may be obtained according to Equation 2. In addition, according to the method for correcting an overcurrent relay according to the embodiment of the present disclosure, the characteristic variable $M^{SFCL}$ calculated when the superconducting fault current limiter 30 operates may be obtained according to Equation 3. In other words, according to Equation 3, a decreased amount of the fault current $I_f$ due to the operation of the superconducting fault current limiter 30 may be compensated by using the superconducting fault current limiter voltage $V_{SFCL}^{SFCL}$ having a positive value. As described above, according to the method for correcting an overcurrent relay according to an embodiment of the present disclosure, it is possible to suppress the change of the characteristic variable M for calculating the tripping time $T_{trip}$ regardless of whether the superconducting fault current limiter 30 operates or not.

Accordingly, when a point of time at which an accumulated trip signal $trip^{W/O}$ when the superconducting fault current limiter 30 does not operate becomes 1 is compared with a point of time at which an accumulated trip signal $trip^{SFCL}$ when the superconducting fault current limiter 30 operates becomes 1, it is found that about 6 ms is delayed when the superconducting fault current limiter 30 operates, and this may be regarded as there is substantially no trip delay.

While the present disclosure has been described with reference to the embodiments, it will be understood by those skilled in the art that various changes and modifications may be made without departing from the scope of the present disclosure as set forth in the appended claims.

REFERENCE SIGNS

1000: power system
10: system power source
30: superconducting fault current limiter
50: breaker
70: load
100: overcurrent relay 110: current measuring unit
120: voltage measuring unit

What is claimed is:

1. A directional overcurrent relay using a superconducting fault current limiter voltage as a relay element, the directional overcurrent relay comprising:
    a current measuring circuit measuring a current of a line connected from a system power source to a load;
    a voltage measuring circuit measuring a voltage at both ends of a superconducting fault current limiter connected to the line; and
    a correcting circuit correcting a tripping time $T_{trip}$ by using a fault current $I_f$ that is the current of the line and a superconducting fault current limiter voltage $V_{SFCL}$ that is the voltage at both ends of the superconducting fault current limiter, wherein the tripping time $T_{trip}$ is maintained consistently regardless of whether the superconducting fault current limiter operates or not,
    wherein the correcting circuit is configured to calculate a characteristic variable M allowing a decreased amount of the fault current $I_f$ due to the operation of the superconducting fault current limiter to be compensated by adding an amount of the superconducting fault current limiter voltage $V_{SFCL}$ modified by a modification factor $\alpha$ to the decreased amount of the fault current $I_f$, and configured to correct the tripping time $T_{trip}$ by using the characteristic variable M.

2. The directional overcurrent relay of claim 1, wherein when a fault occurs, the correcting circuit modifies the superconducting fault current limiter voltage $V_{SFCL}$ by using the modification factor $\alpha$ that is preset by a ratio $I_f/I_f^{SFCL}$ of the current measured at the line according to whether the superconducting fault current limiter operates and an impedance $Z_{SFCL}$ of the superconducting fault current limiter, and calculates the characteristic variable M.

3. The directional overcurrent relay of claim 1, wherein the correcting circuit maintains a time lever value TD and a current tap value $I_{pickup}$ that are preset, and corrects the tripping time $T_{trip}$ by controlling the characteristic variable M according to the superconducting fault current limiter voltage $V_{SFCL}$.

4. The directional overcurrent relay of claim 1, further comprising:
    a trip signal transmitting circuit transmitting a trip signal to the breaker and operating a breaker that blocks the fault current $I_f$ flowing to the load when the tripping time $T_{trip}$ is reached.

5. A method for correcting a directional overcurrent relay that uses a superconducting fault current limiter voltage, the method comprising:
    measuring a fault current $I_f$ that is a current of a line connected from a system power source to a load;
    measuring a superconducting fault current limiter voltage $V_{SFCL}$ that is a voltage at both ends of a superconducting fault current limiter connected to the line; and
    correcting a tripping time $T_{trip}$ by using the fault current $I_f$ and the superconducting fault current limiter voltage $V_{SFCL}$, wherein the tripping time $T_{trip}$ is maintained consistently regardless of whether the superconducting fault current limiter operates or not,
    wherein the correcting the tripping time $T_{trip}$ includes calculating a characteristic variable M allowing a decreased amount of the fault current $I_f$ due to the operation of the superconducting fault current limiter to be compensated by adding an amount of the superconducting fault current limiter voltage $V_{SFCL}$ modified by a modification factor $\alpha$ to the decreased amount of the fault current $I_f$, and correcting the tripping time $T_{trip}$ by using the characteristic variable M.

6. The method of claim 5, wherein
    the modification factor $\alpha$ is preset by a ratio $I_f/I_f^{SFCL}$ of the current measured at the line according to whether the superconducting fault current limiter operates and an impedance $Z_{SFCL}$ of the superconducting fault current limiter.

7. The method of claim 5, wherein in the correcting the tripping time $T_{trip}$, a time lever value TD and a current tap value $I_{pickup}$ that are preset are maintained, and the tripping time $T_{trip}$ is corrected by controlling the characteristic variable M according to the superconducting fault current limiter voltage $V_{SFCL}$.

8. The method of claim 5, further comprising:
    transmitting a trip signal for operating a breaker that blocks the fault current $I_f$ flowing to the load when the tripping time $T_{trip}$ is reached, to the breaker.

* * * * *